US009874263B2

(12) United States Patent
Noguchi

(10) Patent No.: US 9,874,263 B2
(45) Date of Patent: Jan. 23, 2018

(54) SHOCK ABSORBER

(71) Applicant: KYB Motorcycle Suspension Co., Ltd., Gifu (JP)

(72) Inventor: Nobuhiro Noguchi, Gifu (JP)

(73) Assignee: KYB MOTORCYCLE SUSPENSION CO., LTD., Gifu (JP)

( * ) Notice: Subject to any disclaimer, the term of this patent is extended or adjusted under 35 U.S.C. 154(b) by 0 days.

(21) Appl. No.: 15/165,996

(22) Filed: May 26, 2016

(65) Prior Publication Data

US 2016/0363185 A1 Dec. 15, 2016

(30) Foreign Application Priority Data

Jun. 11, 2015 (JP) .................................. 2015-118164

(51) Int. Cl.

| B60G 11/27 | (2006.01) |
|---|---|
| F16F 9/58 | (2006.01) |
| F16F 9/06 | (2006.01) |
| F16F 9/02 | (2006.01) |
| F16F 13/00 | (2006.01) |
| F16F 5/00 | (2006.01) |
| F16F 9/18 | (2006.01) |
| B60G 17/08 | (2006.01) |
| B60G 17/052 | (2006.01) |

(52) U.S. Cl.
CPC ................ F16F 9/585 (2013.01); F16F 9/06 (2013.01); B60G 11/27 (2013.01); B60G 17/052 (2013.01); B60G 17/08 (2013.01); F16F 5/00 (2013.01); F16F 9/0209 (2013.01); F16F 9/18 (2013.01); F16F 13/002 (2013.01)

(58) Field of Classification Search
CPC ...... F16F 9/585; F16F 9/06; F16F 9/18; F16F 9/0209; F16F 5/00; F16F 13/002; B60G 17/08; B60G 17/044; B60G 17/052; B60G 11/27
USPC .......................... 188/297, 312, 314, 315, 317
See application file for complete search history.

(56) References Cited

U.S. PATENT DOCUMENTS

| 2,649,936 A * | 8/1953 | Crabtree .................... F16F 9/18 188/315 |
|---|---|---|
| 2,728,419 A * | 12/1955 | Crabtree .................... F16F 9/18 188/269 |
| 5,152,547 A * | 10/1992 | Davis .................... B60G 17/018 188/313 |

(Continued)

FOREIGN PATENT DOCUMENTS

JP 2001-501155 1/2001

*Primary Examiner* — Thomas W Irvin
(74) *Attorney, Agent, or Firm* — Paratus Law Group, PLLC

(57) ABSTRACT

To achieve the object described above, a shock absorber to solve the problem of the present invention includes a cover that covers an outer periphery of a cylinder which a reaction force air chamber forming member is slid ably in contact with, so that a slidable movement surface of the cylinder on which the reaction force air chamber forming member slidably moves is protected by the cover. Therefore, the slidable movement surface of the cylinder is not damaged by being hit by a flying stone or the like, an air tight property of the reaction force air chamber is maintained, and characteristics of an air spring included in the shock absorber do not change.

6 Claims, 2 Drawing Sheets

(56) References Cited

U.S. PATENT DOCUMENTS

| | | | | |
|---|---|---|---|---|
| 5,467,971 A * | 11/1995 | Hurtubise | B60G 15/068 | 188/322.12 |
| 5,779,007 A * | 7/1998 | Warinner | F16F 9/48 | 188/289 |
| 5,878,852 A * | 3/1999 | Masamura | B60G 17/044 | 188/289 |
| 5,984,060 A * | 11/1999 | Clark | B60G 3/01 | 188/269 |
| 6,032,933 A * | 3/2000 | Beck | B60G 17/044 | 188/289 |
| 6,244,397 B1 * | 6/2001 | Kars | F16F 9/18 | 188/315 |
| 6,491,146 B1 * | 12/2002 | Yi | B62K 25/04 | 188/319.2 |
| 6,640,941 B2 * | 11/2003 | Taylor | F16F 9/0209 | 188/314 |
| 6,676,076 B1 * | 1/2004 | Davies | B64C 25/60 | 188/314 |
| 6,938,887 B2 * | 9/2005 | Achenbach | B60G 17/08 | 188/315 |
| 7,000,907 B2 * | 2/2006 | Achenbach | B60G 15/065 | 188/317 |
| 7,017,720 B2 * | 3/2006 | Yoshimoto | F16F 9/20 | 188/315 |
| 7,073,643 B2 * | 7/2006 | Schel | B60G 17/08 | 188/282.8 |
| 7,635,051 B2 * | 12/2009 | Beck | B60G 17/044 | 188/322.19 |
| 7,828,125 B2 * | 11/2010 | Sekiya | B60G 13/08 | 188/267 |
| 8,042,791 B2 * | 10/2011 | Schmitz | F16F 9/092 | 267/64.17 |
| 8,078,360 B2 * | 12/2011 | Sekiya | B60G 17/0165 | 188/266.1 |
| 8,167,099 B2 * | 5/2012 | Lassus | B64C 25/60 | 188/287 |
| 8,240,439 B2 * | 8/2012 | Nakajima | F16F 9/3485 | 188/282.5 |
| 8,251,355 B2 * | 8/2012 | Tomiuga | B62K 25/08 | 188/312 |
| 8,276,719 B2 * | 10/2012 | Trujillo | F16F 9/504 | 188/275 |
| 8,336,683 B2 * | 12/2012 | McAndrews | F16F 9/096 | 188/275 |
| 8,371,424 B2 * | 2/2013 | De Kock | B60G 13/06 | 188/304 |
| 8,561,764 B2 * | 10/2013 | Battlogg | F16F 9/5126 | 188/266.2 |
| 8,770,358 B2 * | 7/2014 | Nakajima | F16F 9/3482 | 188/267.2 |
| 8,838,335 B2 * | 9/2014 | Galasso | B60G 17/018 | 280/755 |
| 8,863,918 B2 * | 10/2014 | Murakami | F16F 9/064 | 188/269 |
| 8,869,959 B2 * | 10/2014 | Yablon | B60G 11/27 | 188/319.1 |
| 9,038,792 B2 * | 5/2015 | Sumida | B62K 25/08 | 188/314 |
| 9,518,630 B2 * | 12/2016 | McAndrews | F16F 9/0209 | |
| 2008/0029939 A1 * | 2/2008 | Beck | B60G 17/044 | 267/64.17 |
| 2011/0155524 A1 * | 6/2011 | Crasset | F16F 9/064 | 188/316 |
| 2012/0091638 A1 * | 4/2012 | Panichgasem | F16F 9/363 | 267/64.26 |
| 2014/0216870 A1 * | 8/2014 | Nakajima | B60G 17/08 | 188/280 |
| 2015/0054247 A1 * | 2/2015 | Barefoot | B60G 11/27 | 280/124.157 |
| 2016/0363184 A1 * | 12/2016 | Noguchi | F16F 9/062 | |
| 2017/0114856 A1 * | 4/2017 | Yoshida | F16F 9/185 | |
| 2017/0129566 A1 * | 5/2017 | Barefoot | B62K 25/06 | |

\* cited by examiner

SHOCK ABOSRBER

CROSS-REFERENCE TO RELATED APPLICATIONS

This application is based on and claims the benefit of priority from Japanese Patent Application No. 2015-118164, filed on Jun. 11, 2015, the entire contents of which are incorporated herein by reference.

BACKGROUND OF THE INVENTION

Technical Field

The present invention relates to a shock absorber.

Related Art

Conventionally, for a shock absorber used in a saddle type vehicle, a shock absorber that uses an air spring instead of a metallic coil spring as a suspension spring is developed to reduce the weight of the shock absorber. For example, as disclosed in JP 2001-501155 A, a shock absorber that uses the air spring includes a cylinder, a rod that is movably inserted into the cylinder, and a tubular member which is attached to an end portion of the rod and forms a chamber between the tubular member and the cylinder.

In the shock absorber, the air spring is formed by enclosing high-pressure gas in the chamber and when the shock absorber is expanded and contracted, the volume of the air chamber is expanded and contracted, so that it is possible to obtain a spring reaction force according to a degree of expansion and contraction of the shock absorber. Here, the air spring biases the shock absorber in an expansion direction by an internal pressure and exhibits nonlinear spring characteristics with respect to the amount of stroke of the shock absorber, and when the suspension spring is formed by only the air spring, the spring force is too large with respect to the amount of stroke, so that ride quality of the vehicle is degraded. Therefore, in a conventional shock absorber, an airtight chamber is provided between the tubular member and the compressor piston by causing the lower end of the tubular member to be slidably in contact with the outer periphery of the cylinder.

A high-pressure gas is enclosed inside the airtight chamber, so that the airtight chamber functions as an air spring. Therefore, different from the chamber described above, the air chamber generates a spring force that biases the shock absorber in a compression direction.

In this way, the shock absorber includes the air spring formed by the airtight chamber that generates a spring force in the direction opposite to the direction of the force of the air spring formed by the chamber different from the air chamber, so that the shock absorber realizes spring characteristics close to those of a coil spring and improves the ride quality of the vehicle.

SUMMARY OF THE INVENTION

The shock absorber employs a structure in which the tubular member is slidably in contact with the outer periphery of the cylinder, so that a problem described below occurs.

In the conventional shock absorber, a seal is provided between the cylinder and the tubular member to seal the airtight chamber. However, the seal reciprocates in an axis direction on the outer periphery of the cylinder along with the expansion and contraction of the shock absorber, so that it is necessary to make the outer peripheral surface of the cylinder, on which the seal slides, smooth.

However, the outer periphery of the cylinder exposes to outside, so that there is a possibility that a flying stone or the like comes into contact with the outer periphery of the cylinder to damage the outer peripheral surface of the cylinder. If the outer peripheral surface of the cylinder is roughened, the gas in the airtight chamber leaks and spring characteristics of the entire air spring provided in the shock absorber become nonlinear. Therefore, the ride quality is degraded.

Therefore, an object of the present invention is to provide a shock absorber that can maintain the spring characteristics of the air spring and does not degrade the ride quality of the vehicle.

To achieve the above object, the shock absorber to solve the problem of the present invention includes a cover that covers an outer periphery of a cylinder which a reaction force air chamber forming member is slidably in contact with.

DESCRIPTION OF THE EMBODIMENTS

First Embodiment

Figure 1:
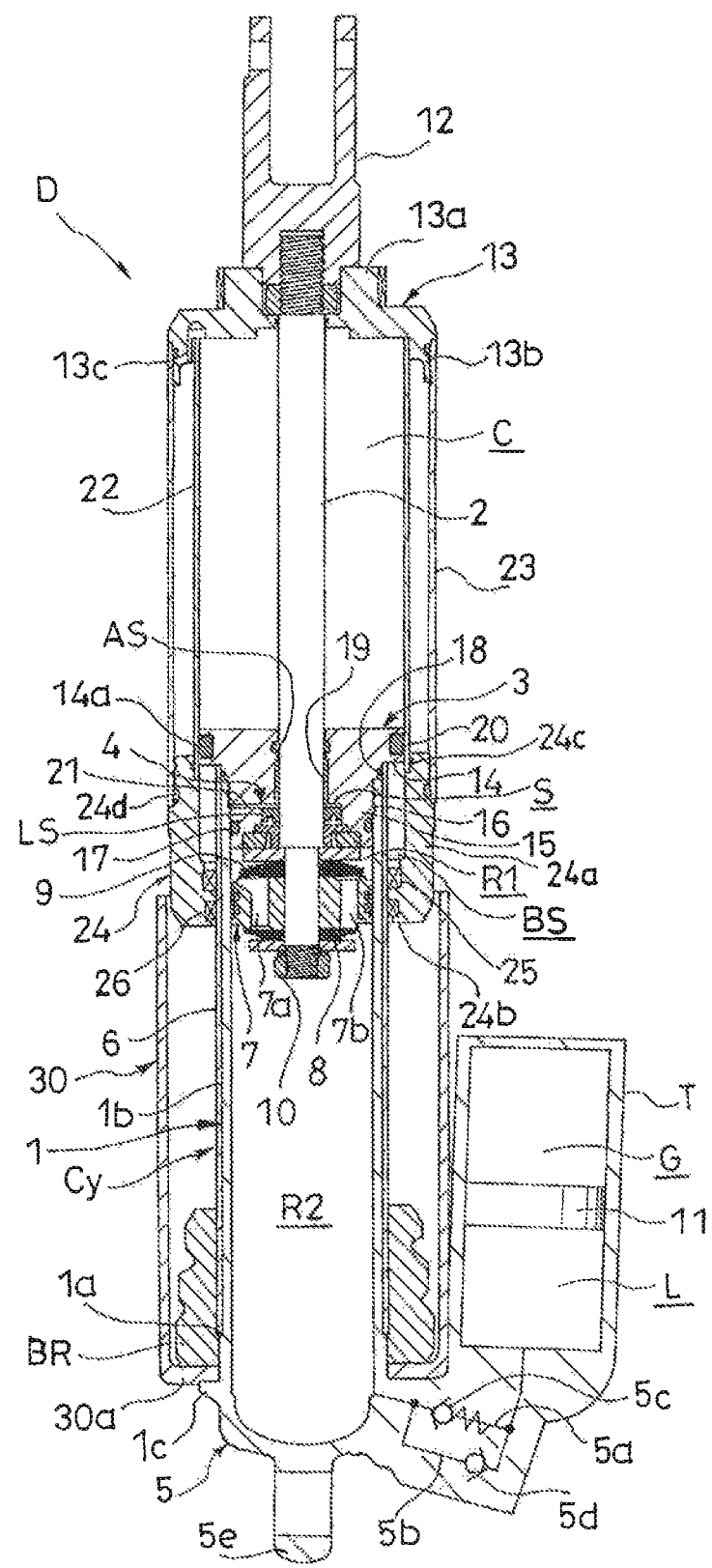
FIG. 1 is a longitudinal sectional view of a shock absorber according to a first embodiment of the present invention.

Hereinafter, the present invention will be described based on the embodiments shown in the drawings. As shown in FIG. 1, a shock absorber D according to a first embodiment includes a cylinder Cy, a rod 2 that is movably inserted into the cylinder Cy, a tubular chamber member 22 whose one end is connected to the rod 2, a flange-shaped air piston 14 which is attached to the cylinder Cy and is slidably in contact with the inner periphery of the chamber member 22 to form an air chamber C with the chamber member 22, a reaction force air chamber forming member 24 which is attached to the other end of the chamber member 22 and is slidably in contact with the outer periphery of the cylinder Cy to form a reaction force air chamber BS between the reaction force air chamber forming member 24 and the air piston 14, and a tubular cover 30 which enables the reaction force air chamber forming member 24 to move in and out and covers the outer periphery of the cylinder Cy.

Hereinafter, each component will be described. The cylinder Cy includes a tubular inner tube 1 including a cap 5 that closes a lower end in FIG. 1 and an outer tube 6 that is attached to the outer periphery of the inner tube 1. A ring-shaped rod guide 3 is attached to an upper end of the cylinder Cy in FIG. 1. A step portion 1a is provided to the outer periphery of the inner tube 1. The outer diameter of an upper portion of the inner tube 1 in FIG. 1, which is closer to the rod 2 than the step portion 1a, is formed to be smaller than the diameter of a portion of the inner tube 1 lower than the step portion 1a, so that a small diameter portion 1b is formed. The outer tube 6 is attached to the small diameter portion 1b of the inner tube 1. The lower end of the outer tube 6 is in contact with the step portion 1a, so that downward movement of the outer tube 6 with respect to the inner tube 1 is restricted. A flange 1c protruding to the outer periphery side is provided to a portion of the inner tube 1 lower than the step portion 1a in FIG. 1.

The outer periphery of the outer tube 6 is finished to a smooth surface by plating treatment or polishing treatment. The inside of the inner tube 1 is partitioned into an expansion-side chamber R1 and a compression-side chamber R2, both of which are filled with liquid, by a piston 7 connected to the lower end of the rod 2 in FIG. 1. As the liquid filled into the inner tube 1, for example, hydraulic oil is used. However, other liquid, such as water, water solution, electrorheological fluid, and magnetorheological fluid can also be used.

The piston 7 is provided with an expansion side flow passage 7a and a compression side flow passage 7b which connect the expansion-side chamber R1 and the compression-side chamber R2 with each other. An expansion side leaf valve 8 that opens and closes an outlet end of the expansion side flow passage 7a is laminated on the lower end of the piston 7 in FIG. 1 and an compression side leaf valve 9 that opens and closes an outlet end of the compression side flow passage 7b is laminated on the upper end of the piston 7 in FIG. 1. The expansion side leaf valve 3 and the compression side leaf valve 9 have a ring shape, are fixed to the tip of the rod 2 along with the piston 7 by a piston nut 10, and are allowed to bend at the outer peripheral side. Therefore, the expansion side leaf valve 8 can open the expansion side flow passage 7a when receiving pressure of the expansion-side chamber R1 and being bent and the compression side leaf valve 9 can open the compression side flow passage 7b when receiving pressure of the compression-side chamber R2 and being bent.

The cap 5 that closes the lower end of the inner tube 1 includes an attachment portion 5e for connecting the shock absorber D to a vehicle and a tubular tank T along lateral the inner tube 1. A free piston 11 is slidably inserted into the tank T. The free piston 11 divides the inside of the tank T into a gas chamber G filled with gas and a liquid chamber L filled with liquid. The liquid chamber is connected to the compression-side chamber R2 through a discharge flow passage 5a and a suction flow passage 5b provided in the cap 5. The flow passage 5a is provided with a damping valve 5c that allows only flow of liquid toward the liquid chamber 1 from the compression-side chamber R2 and provides resistance to the flow. The suction flow passage 5b is provided with a check valve 5d that allows only flow of liquid toward the compression-side chamber R2 from the liquid chamber L. It is possible to eliminate the tank T and provide the discharge flow passage 5a, the suction flow passage 5b, the damping valve 5c, the check valve 5d, and a reservoir in the cylinder Cy.

The upper end of the rod 2 in FIG. 1 extends to the outside of the cylinder Cy through inside the ring-shaped rod guide 3 attached to the upper end of the cylinder Cy in FIG. 1. The rod guide 3 has a ring shape and includes the flange-shaped air piston 14 with an outer diameter larger than that of the cylinder Cy on the upper end outer periphery of the rod guide 3 in FIG. 1. A portion of the rod guide 3 lower than the air piston 14 is formed as a small diameter portion 15 whose outer diameter is smaller than that of the air piston 14. A screw portion 16 is provided on a part of the outer periphery of the small diameter portion 15 of the rod guide 3. The air piston 14 includes a ring-shaped groove 14a formed on the outer periphery and a piston seal 20 mounted in the ring-shaped groove 14a. The air piston 14 may be indirectly attached to the cylinder Cy by attaching the rod guide 3 including the air piston 14 to the cylinder Cy or the air piston 14 may be directly and integrally provided to the outer periphery of the cylinder Cy.

The small diameter portion 15 is inserted into the outer tube 6 and the inner tube 1 which form the cylinder Cy and the screw portion 18 is screwed together with the inner periphery of the inner tube 1. Then, the rod guide 3 is fixed to the inner tube 1. When the rod guide 3 is screwed and fixed to the inner tube 1, the outer tube 6 is sandwiched by the step portion 1a and the lower end of the air piston 14, so that the outer tube 6 is fixed to and integrated with the inner tube 1. When the rod guide 3 is attached to the cylinder Cy in this way, the rod guide 3 faces the air chamber C provided on the outer periphery of the rod 2.

A ring-shaped seal 18 in contact with the inner periphery of the outer tube 6 and a ring-shaped seal 17 in contact with the inner periphery of the inner tube 1 are attached to the outer periphery of the small diameter portion 15 of the rod guide 3 with the screw portion 16 in between. Further, on the inner periphery of the rod guide 3, there are a tubular bush 19 which is slidably in contact with the outer periphery of the rod 2 and guides movement in the vertical direction in FIG. 1 which is the axis direction of the rod 2, an air seal AS which is arranged higher than the bush 19 and closer to the air chamber C than the bush 19 in FIG. 1, is slidably in contact with the outer periphery of the rod 2, and prevents gas from entering the inside of the cylinder Cy, and a liquid seal LS which is formed of rubber, resin, or the like, is arranged lower than the bush 19 and closer to the cylinder Cy than the bush 19 in FIG. 1, is slidably in contact with the outer periphery of the rod 2, and prevents liquid from leaking from the inside of the cylinder Cy.

The liquid seal LS is provided to the rod guide 3 in this way, so that the inside of the cylinder Cy is sealed and the inside of the cylinder Cy is maintained to be liquid-tight. Further, the air seal AS is provided to the rod guide 3, so that the air chamber C is maintained to be air-tight and gas is prevented from entering the inside of the cylinder Cy.

The rod guide 3 is provided with a through hole 21 which has an opening between the bush 19 and the liquid seal LS and connects to the screw portion 16 of the small diameter portion 15. In other words, one end of the through hole 21 connects to a space S between the rod guide 3 and the rod 2 and between the air seal AS and the liquid seal LS. The space S is a ring-shaped gap between the rod guide 3 and the rod 2 and is a space partitioned between the air seal AS and the liquid seal LS. The other end of the through hole 21 is connected to a cap between the outer tube 6 and the inner tube 1 through a gap between the rod guide 3 and the inner tube 1. To secure the connection between the gap between the outer tube 6 and the inner tube 1 and the through hole 21, the ring-shaped seal 18 is arranged higher than the upper end of the inner tube 1 and the other end of the through hole 21 opens from between the ring-shaped seal 17 and the ring-shaped seal 18.

The space S is connected to the outside of the cylinder Cy through the through hole 21, the gap between the rod guide 3 and the inner tube 1, and the gap between the outer tube 6 and the inner tube 1, and is released to the atmosphere. Therefore, in the present embodiment, the space S is connected to the outside of the cylinder Cy through a pressure release passage 4 composed of the through hole 21, the gap between the rod guide 3 and the inner tube 1, and the gap between the outer cube 6 and the inner tube 1.

An attachment member 12 for connecting the shock absorber D to the vehicle and a ring-shaped chamber holder 13 are attached to the upper end of the rod 2 in FIG. 1. The chamber holder 13 has a ring shape and includes an attachment portion 13a attached to the upper end periphery of the rod 2 in FIG. 1 and a tubular portion 13b extending downward in FIG. 1 from the periphery of the attachment portion 13a.

Further, the upper end in FIG. 1 of the chamber member 22 into which the tubular air piston 14, which is arranged at the outer periphery side of the rod 2 and provided to the rod guide 3, is slidably inserted is fitted to the chamber holder 13, and the upper end in FIG. 1 of a tubular outer chamber member 23 arranged at the outer periphery side of the chamber member 22 is attached to the chamber holder 13.

The chamber member 22 has a tubular shape and the upper end in FIG. 1 of the chamber member 22 is fitted to the inner periphery of the tubular portion 13b of the chamber holder 13 so that the chamber member 22 can move somewhat in the radial direction by providing a fitting gap to the inner periphery of the tubular portion 13b. In other words, the upper end of the chamber member 22 is fitted (loosely fitted) to the inner periphery of the tubular portion 13b with a play in the radial direction. Further, the piston seal 20 attached to the air piston 14 is slidably in contact with the inner periphery of the chamber member 22 and an opening end of the chamber member 22 is air-tightly closed.

The outer chamber member 23 has a tubular shape and the upper end in FIG. 1 of the outer chamber member 23 is screw-engaged with and attached to the outer periphery of the tubular portion 13b of the chamber holder 13. A notch 13c is provided to a portion from the inner periphery of the tubular portion 13b of the chamber holder 13 to the attachment portion 13a, and the inside of the chamber member 22 and a ring-shaped gap between the chamber member 22 and the outer chamber member 23 is connected through the notch 13c.

The reaction force air chamber forming member 24 that forms the reaction force air chamber BS between the reaction force air chamber forming member 24 and the air piston 14 is attached to a cylinder side end, which is the lower end in FIG. 1 of the chamber member 22 and the outer chamber member 23, in slidably contact with the outer tube 6.

Specifically, the reaction force air chamber forming member 24 includes a tubular main body 24a which is fitted to the lower end of the chamber member 22 and is screwed to the inner periphery of the outer chamber member 23, a ring-shaped inside flange portion 24b which protrudes from the lower end in FIG. 1 of the tubular main body 24a toward the inner periphery side and is slidably in contact with the outer periphery of the outer tube 6, and ring-shaped seal members 25 and 26 which are attached to the inner periphery of the inside flange portion 24b and are slidably in contact with the outer periphery of the outer tube 6.

The chamber member 22 is fitted to the reaction force air chamber forming member 24 by providing a fitting gap to the reaction force air chamber forming member 24, in other words, the chamber member 22 is fitted (loosely fitted) to the reaction force air chamber forming member 24 with a play in the radial direction. Therefore, the chamber member 22 can move somewhat in the radial direction with respect to the reaction force air chamber forming member 24. The reaction force air chamber forming member 24 includes a ring-shaped seal 24c closely attached to the outer periphery of the chamber member 22 and a ring-shaped seal 24d closely attached to the inner periphery of the outer chamber member 23 on the inner periphery and the outer periphery of the tubular main body 24a, respectively, and seals the ring-shaped gap between the chamber member 22 and the outer chamber member 23. Therefore, the air chamber C is formed by the air piston 14, the chamber holder 13, the chamber member 22, the outer chamber member 23, and the reaction force air chamber forming member 24. The air chamber C includes the inside of the chamber member 22 and the ring-shaped gap described above. The ring-shaped gap between the chamber member 22 and the outer chamber member 23 is also a part of the air chamber C, so that even when the shock absorber D is maximally contracted and the air chamber C is maximally contracted, the minimum volume of the air chamber C can be secured and the pressure in the air chamber C will not be excessive. In the present embodiment, the volume of the air chamber C when the air chamber C is maximally contracted is secured by providing the outer chamber member 23 over the outer periphery of the chamber member 22. However, if this is not required, the outer chamber member 23 may be eliminated. The chamber holder 13 can be united and integrated with one or both of the chamber member 22 and the outer chamber member 23. Therefore, the chamber member 22 may be indirectly connected to the rod 2 through the chamber holder 13 or may be directly connected to the chamber holder 13. That is to say, the chamber member 22 only has to be connected to the rod 2.

The reaction force air chamber forming member 24 causes the seal members 25 and 26 provided on the inner periphery of the inside flange portion 24b to be slidably in contact with the outer tube 6. The reaction force air chamber BS is formed by the reaction force air chamber forming member 24, the outer tube 6, and the air piston 14. The outer periphery of the outer tube 6 is a smooth surface, so that the seal members 25 and 26 can form the inside of the reaction force air chamber BS to a closed space and also can reduce sliding friction.

The inside of the air chamber C and the inside of the reaction force air chamber BS are filled with gas. As the gas, air can be used and inactive gas or the like can also be used. The air chamber C filled with gas presses the air piston 14 down in FIG. 1 by an inside gas pressure. Therefore, the air chamber C functions as an air spring that generates a spring force biasing the rod 2 in a direction in which the rod 2 is moving away from the cylinder Cy, that is, a spring force biasing the shock absorber D in an expansion direction. On the other hand, the reaction force air chamber BS filled with gas presses the air piston 14 up in FIG. 1 by an inside gas pressure. Therefore, the reaction force air chamber BS functions as an air spring that generates a spring force biasing the rod 2 in a direction in which the rod 2 enters the inside of the cylinder Cy, that is, a spring force biasing the shock absorber D in a compression direction.

The air spring formed by the air chamber C biases the shock absorber D in the expansion direction at all times by the internal pressure, generates a large resilient force even when the shock absorber C is slightly stroked in a contraction direction, and shows spring characteristics that generate a resilient force nonlinear with the amount of stroke of the shock absorber D. On the other hand, the reaction force air chamber BS functions as an air spring that biases the shock absorber D in a direction opposite to the direction of the air spring formed by the air chamber C. Therefore, it is possible to obtain total spring characteristics of the air spring formed by the air chamber C and the air spring formed by the reaction force air chamber BS, which are approximate to spring characteristics of a coil spring proportional to the amount of stroke of the shock absorber D.

The tubular cover 30 is attached to the outer periphery of the cylinder Cy and the outer periphery of the cylinder Cy is covered and protected by the cover 30. The cover 30 allows the reaction force air charmer forming member 24 to enter and covers and protects the outer peripheral surface of the outer tube 6 which the seal members 25 and 26 is slidably in contact with. The cover 30 includes an inside flange 30a that protrudes toward the inner periphery side at the lower end of the cover 30 in FIG. 1. The inside diameter of the inside flange 30a is a little larger than the outside diameter of the outer tube 6 and allows the outer tube 6 to be inserted. When the cover 30 is attached to the cylinder Cy from above the cylinder Cy, the inside flange 30a comes into contact with the flange 1c of the inner tube 1 and a downward movement of the cover 30 with respect to the cylinder Cy in FIG. 1 is restricted. In this state, a tubular bump cushion rubber BR is inserted into a ring-shaped space between the cover 30 and the cylinder Cy until the bump cushion rubber BR comes into contact with the inside flange 30a. Then, the lower end inner periphery of the bump cushion rubber BR tightens the outer periphery between the step portion 1a of the inner tube 1 and the flange 1c and is fixed to the inner tube 1. At the same time, the bump cushion rubber BR and the flange 1c sandwich the inside flange 30a, so that the cover 30 is fixed to the cylinder Cy. The inside diameter of the bump cushion rubber BR is set to a diameter that does not tighten the outer tube 6, so that the outlet end of the pressure release passage 4 is not closed. To avoid closure of the pressure release passage 4, a groove extending from the upper end of the inner periphery of the bump cushion rubber BR to a position facing the lower end of the outer tube 6 may be provided on the inner periphery of the bump cushion rubber BR.

The bump cushion rubber BR exhibits a function to fix the cover 30 to the cylinder Cy and, the bump cushion rubber BR is caused to come in contact with the reaction force air chamber forming member 24 and compressed due to contraction of the shock absorber D when the rod 2 comes close to the cylinder Cy. Then, the bump cushion rubber BR exhibits a resilient force that prevents further contraction of the shock absorber D, so that the bump cushion rubber BR exhibits a cushion function.

The shock absorber D is configured as described above. Hereinafter, the operation of the shock absorber D will be described. First, when the shock absorber P expands, the rod 2 moves upward in FIG. 1 with respect to the cylinder Cy and the piston 7 is displaced upward in the cylinder Cy, so that the expansion-side chamber R1 is compressed and the compression-side chamber R2 is enlarged.

Then, the pressure in the compressed expansion-side chamber R1 increases, and the liquid in the expansion-side chamber R1 presses and opens the expansion side leaf valve 8 and moves to the compression-side chamber R2 through the expansion side flow passage 7a provided in the piston 7. The rod 2 goes out from the cylinder Cy and, in the cylinder Cy, a volume of liquid corresponding to a volume of a part of the rod 2 that goes out from the cylinder Cy is in short supply. However, the check valve 5d opens and liquid corresponding to the short supply is supplied from the liquid chamber to the compression-side chamber R2 through the suction flow passage 5b. While the pressure in the expansion-side chamber R1 increases, the compression-side chamber R2 receives supply of liquid from the liquid chamber L, so that the pressure in the compression-side chamber R2 is substantially the same as that in the tank T. Therefore, a difference occurs between the pressure in the expansion-side chamber R1 and the pressure in the compression-side chamber R2, and the differential pressure applies to the piston 7. As a result, the shock absorber D generates a damping force that prevents the expanding operation. When the rod 2 rises in FIG. 1, the chamber member 22 is separated from the air piston 14, the volume of the air chamber C is increased, the reaction force air chamber forming member 24 moves upward with respect to the cylinder Cy, and the volume of the reaction force air chamber BS decreases. In this way, the volume of the air chamber C is enlarged and the reaction force air chamber BS is compressed by the expanding operation of the shock absorber C, so that the resilient force of the air spring formed by the air chamber C decreases and the resilient force of the air spring formed by the reaction force air chamber BS increases. Thereby, a total resilient force of the air spring formed by the air chamber C and the air spring formed by the reaction force air chamber BS decreases and becomes small.

Next, when the shock absorber C is compressed, the rod 2 moves downward in FIG. 1 with respect to the cylinder Cy and the piston 7 is displaced downward in the cylinder Cy, so that the compression-side chamber R2 is compressed and the expansion-side chamber R1 is enlarged.

Then, the pressure in the compressed compression-side chamber R2 increases, and the liquid in the compression-side chamber R2 presses and opens the compression side leaf valve 9 and moves to the expansion-side chamber R1 through the compression side flow passage 7b provided in the piston 7. The rod 2 enters the inside of the cylinder Cy and, in the cylinder Cy, a volume of liquid corresponding to a volume of a part of the rod 2 that enters the cylinder Cy becomes excessive. However, the excessive liquid presses and opens the damping valve 5c and is discharged from the compression-side chamber R2 to the liquid chamber L through the discharge flow passage 5a. In this way, resistance is given to a flow of liquid from the compression-side chamber R2 to the expansion-side chamber R1 and the liquid chamber L by the compression side leaf valve 9 and the damping valve 5c, so that the pressure in the compression-side chamber R2 increases, and on the other hand the pressure in the enlarged expansion-side chamber R1 decreases. Therefore, a difference occurs between the pressure in the compression-side chamber R2 and the pressure in the expansion-side chamber R1 and the differential pressure is applied to the piston 7, so that the shock absorber generates a damping force that prevents the contraction operation. Further, when the rod 2 lowers in FIG. 1, the chamber member 22 approaches the air piston 14, the volume of the air chamber C decreases, the reaction force air chamber forming member 24 moves downward with respect to the cylinder Cy, and the volume of the reaction force air chamber BS increases. In this way, the air chamber C is compressed and the volume of the reaction force air chamber BS is enlarged by the compression operation of the shock absorber C, so that the resilient force of the air spring formed by the air chamber C increases and the resilient force of the air spring formed by the reaction force air chamber BS decreases. Thereby, a total resilient force of the air spring formed by the air chamber C and the air spring formed by the reaction force air chamber BS increases and becomes large.

As described above, the shock absorber C generates a damping force when the shock absorber C is expanded and contracted and functions as a suspension spring where an air spring formed by the air chamber C and the reaction force air chamber BS generates a resilient force that supports a vehicle body according to the amount of stroke of the shock absorber C, so that the shock absorber C realizes spring characteristics substantially proportional to the amount of stroke. Therefore, it is possible to realize a suspension spring without using a coil spring, so that it is possible to reduce the entire weight of the shock absorber D.

The shock absorber C of the present invention includes the cover 30 that covers the outer periphery of the cylinder Cy which the reaction force air chamber forming member 24 is slidably in contact with, so that a slidable movement surface of the cylinder Cy on which the reaction force air chamber forming member 24 slidably moves is protected by the cover 30. Thus, the slidable movement surface of the cylinder Cy is not damaged by being hit by a flying stone or the like, an air tight property of the reaction force air chamber BS is maintained, and the characteristics of the air spring included in the shock absorber D do not change. Therefore, according to the shock absorber D of the present invention, the spring characteristics of the air spring can be maintained and the ride quality of the vehicle is not degraded.

In the shock absorber D of the present embodiment, when the bump cushion rubber BR is included which is housed inside the cover 30, is attached to the outer periphery of the cylinder Cy, and suppresses approach of the rod 2 toward the cylinder Cy by coming into contact with the reaction force air chamber forming member 24, it is not necessary to provide a bump cushion rubber in the air chamber C, it is possible to secure the volume of the air chamber C when the shock absorber D is maximally contracted, and it is possible to prevent the pressure in the air chamber C from being excessive.

When providing the flange 1c at an end portion of the cylinder Cy, providing the inside flange 30a protruding toward the inner periphery at an end portion of the cover 30, and sandwiching the inside flange 30a of the cover 30 by the bump cushion rubber BR and the flange 10, the cover 30 can be fixed to the cylinder Cy without adding any component. It is possible to fix the cover 30 to the cylinder Cy by other components or another structure without fixing the cover 30 by the bump cushion rubber BR.

Further, in the shock absorber D of the present embodiment, the tubular outer chamber member 23 is included which is arranged over the outer periphery of the chamber member 22 and the inside of which is connected to the inside of the chamber member 22, and the ring-shaped gap between the chamber member 22 and the outer chamber member 23 is closed by the reaction force air chamber forming member 24, so that the ring-shaped gap is also used as the air chamber C. The volume of the ring-shaped gap does not change even when the shock absorber D expands or contracts, so that it is possible to secure a larger volume of the air chamber C when the shock absorber is maximally contracted and it is possible to further prevent the pressure in the air chamber C from being excessive when the shock absorber D is maximally contracted.

In the shock absorber D of the present embodiment, the chamber member 22 is loosely fitted to the chamber holder 13 and the reaction force air chamber forming member 24, so that the chamber member 22 can move in the radial direction. Therefore, the chamber member 22 can move in the radial direction with respect to the air piston 14. Thus, even when a lateral force that applies a bending moment to the shock absorber D is inputted to the shock absorber D, the chamber member 22 is not too strongly pressed against the piston seal 20 attached to the outer periphery of the air piston 14 thanks to a play in the radial direction. Therefore, when the chamber member 22 moves in the vertical direction in FIG. 1 with respect to the air piston 14 due to the expansion and contraction of the shock absorber D, a frictional force generated between the chamber member 22 and the piston seal 20 does not become excessive even when the lateral force is inputted to the shock absorber D. Further, the chamber member 22 is allowed to move in the radial direction with respect to the air piston 14 and the center of the chamber member 22 is adjusted by the air piston 14, so that the frictional force generated between the chamber member 22 and the piston seal 20 does not become excessive. Therefore, highly accurate dimensional control is not required for each component such as the chamber member 22, the outer chamber member 23, the cylinder Cy, and the air piston 14 for smooth expansion and contraction of the shock absorber D. As described above, according to the shock absorber 2, the frictional force generated between the chamber member 22 and the air piston 14 does not become excessive. Therefore, the shock absorber D can smoothly expand or contract, an uncontrollable damping force due to the frictional force is not generated, the ride quality of the vehicle is improved, and highly accurate dimensional control is not required for each component that forms the air chamber C.

Further, in the shock absorber D of the present embodiment, the space S located on the inner periphery of the rod guide 3 facing the air chamber C and between the air seal AS and the liquid seal LS is connected to the outside of the cylinder Cy through the pressure release passage 4. Because of this structure, even when the liquid in the cylinder Cy enters the space S over the liquid seal LS due to the expansion and contraction of the shock absorber C, the pressure in the space S is not accumulated thanks to the pressure release passage 4. Therefore, the pressure in the space S does not become high and a high pressure is not applied from the space S which is located on the back surface of the air seal AS, so that the sealing performance of the air seal AS is not damaged and it is possible to prevent the gas in the air chamber C from entering the inside of the cylinder Cy. Further, a high pressure is not applied to the liquid seal LS from the space S, so that the liquid seal LS can well exhibit sealing performance and an effect of preventing liquid from leaking to the space S is improved.

Therefore, according to the shock absorber C of the present invention, the sealing performance of the air seal AS is not damaged, so that while having the air spring, it is possible to prevent the gas in the air chamber C from entering the inside of the cylinder Cy and the damping force characteristics of the shock absorber D are not negatively affected.

The pressure release passage 4 releases the space S to the atmosphere, so that it is possible to discharge liquid entering the space S to the outside of the shock absorber C and it is possible to reliably prevent the pressure in the space S from increasing. However, the pressure release passage 4 may connect the space S to a sealed chamber provided outside the cylinder Cy. The volume of the sealed chamber may be set so that the amount of liquid estimated to leak from the inside of the cylinder Cy into the sealed chamber does not generate a pressure that negatively affects the air seal AS. By doing so, it is possible to prevent dust and water from entering into the space S.

Further, in the shock absorber D of the present embodiment, the cylinder Cy is provided with the inner tube 1 and the outer tube 6 which is located over the outer periphery of the inner tube 1 and which the reaction force air chamber forming member 24 that closes an end portion of the air chamber C is slidably in contact with, and a part of the pressure release passage 4 is formed by a gap between the inner tube 1 and the outer tube 6, so that it is possible to prevent dust and rain water from entering the space S from the outside of the shock absorber D. Further, the gap between the inner tube 1 and the outer tube 6 is as a part of the pressure release passage 4, so that it is possible to release the space S to the atmosphere with simple structure while bypassing the air chamber C even in a structure in which the reaction force air chamber BS is arranged on the outer periphery of the cylinder Cy. When the pressure release passage 4 is not provided, it is not necessary to release the space S to the atmosphere by using the gap between the outer tube L and the inner tube 1, so that it is possible to eliminate the outer tube 6 by performing processing to make the outer periphery of the inner tube 1 to a smooth surface.

Second Embodiment

Figure 2:
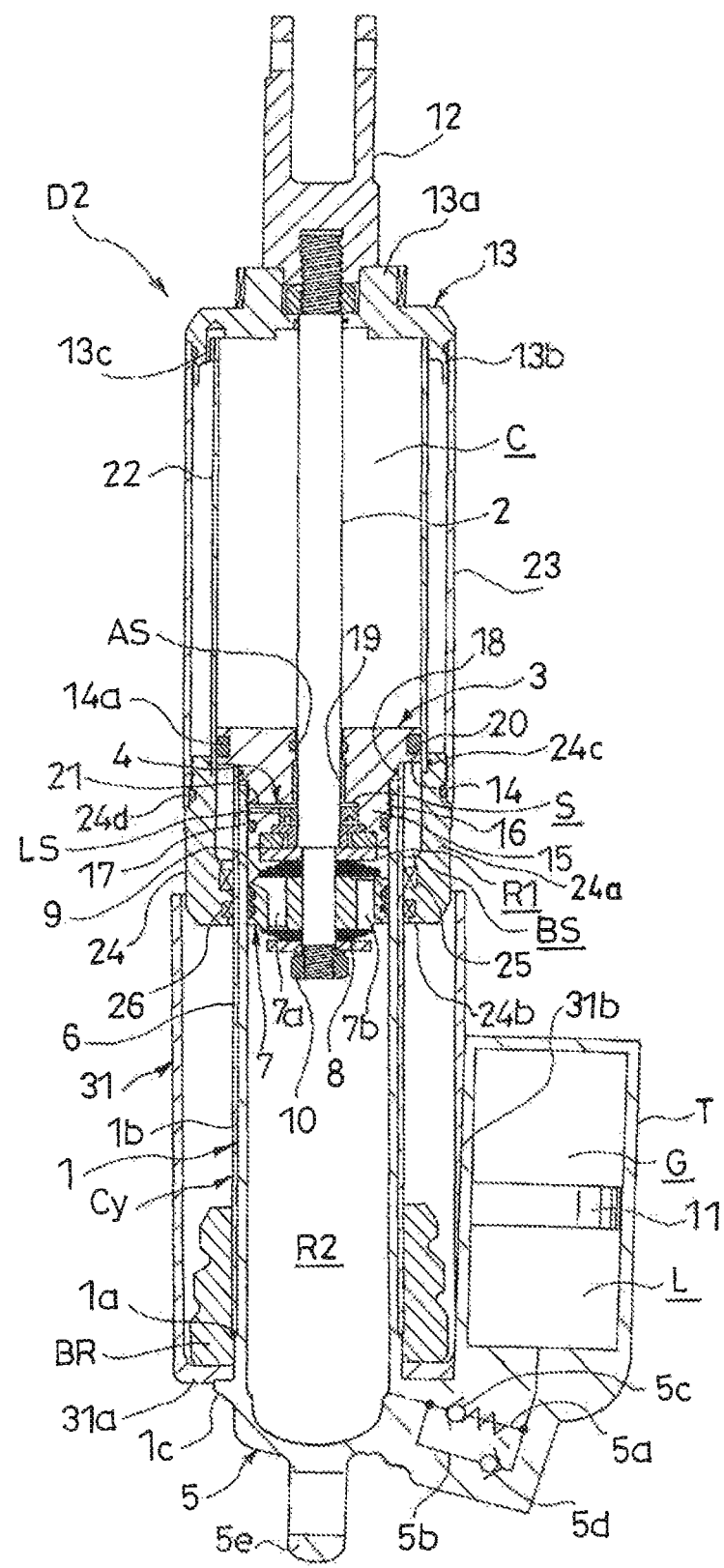
FIG. 2 is a longitudinal sectional view of a shock absorber according to a second embodiment of the present invention.

As shown in FIG. 2, a shock absorber D2 according to a second embodiment is different from the shock absorber D of the first embodiment in a point that the tank T is placed closer to the cylinder Cy and a part of cover is formed by the tank T. In the description of the shock absorber D2 of the second embodiment, the same components as those of the shock absorber D of the first embodiment are denoted by the same reference numerals and their detailed descriptions are omitted because these descriptions are redundant.

The cover 31 is provided with a cut-off portion 31b to which the tank T is fitted in addition to an inside flange 31a at the lower end. Regarding the cover 31, when the inside flange 31a is caused to come into contact with the flange 1c, an end surface of the cut-off portion 31b comes into contact with or faces the outer peripheral surface of the tank T, so that the cover 31 can protect the outer surface of the outer tube 6, which is a sliding contact surface of the cylinder Cy, in cooperation with the tank T. The end surface of the cut-off portion 31b may be in contact with the outer surface of the tank T without any can or there may be some gap between the cover 31 and the tank T if it is possible to protect the sliding contact surface of the cylinder Cy from a flying stone or the like.

As described above, when the tank T forms a part of cover and functions as a cover to protect the sliding contact surface of the cylinder Cy in cooperation with the cover 31, it is possible to arrange the tank T closer to the cylinder Cy. Therefore, it is possible to reduce the size of the shock absorber D in the horizontal direction, so that mountability of the shock absorber P on a vehicle is improved.

What is claimed is:
1. A shock absorber comprising:
a cylinder;
a rod configured to be movably inserted into the cylinder;
a tubular chamber member whose one end is connected to the rod;
a piston which is connected to the rod, and inserted into the cylinder to partition the inside of the cylinder into an expansion-side chamber and a compression-side chamber, both of which are filled with liquid;
an expansion side flow passage and a compression side flow passage, provided in the piston, and which connect the expansion-side chamber and the compression-side chamber with each other;
a flange-shaped air piston which is attached to the cylinder, is slidably in contact with an inner periphery of the chamber member, and forms an air chamber along with the chamber member;
a reaction force air chamber forming member which is attached to the other end of the chamber member, is slidably in contact with an outer periphery of the cylinder, and forms a reaction force air chamber between itself and the air piston;
a tubular cover configured to enable the reaction force air chamber forming member to move in and out and cover the outer periphery of the cylinder; and
a tubular outer chamber member which is arranged over an outer periphery of the chamber member and inside of which is connected to inside of the chamber member, wherein
the reaction force air chamber forming member is attached to end portions of the chamber member and the outer chamber member and closes a ring-shaped gap between the chamber member and the outer chamber member, and
the air chamber is formed by the chamber member, the outer chamber member, the air piston, and the reaction force air chamber forming member.
2. The shock absorber according to claim 1, further comprising:
a tubular bump cushion rubber configured to be housed inside the cover, be attached to the outer periphery of the cylinder, and suppress approach of the rod toward the cylinder by coming into contact with the reaction force air chamber forming member.
3. The shock absorber according to claim 2, wherein
the cylinder includes a flange at an end portion of the cylinder,
the cover includes an inside flange protruding toward an inner periphery at an end portion of the cover, and
the cover is fixed to the cylinder by sandwiching the inside flange of the cover by the flange of the cylinder and the bump cushion rubber.
4. The shock absorber according to claim 1, further comprising:
a tubular tank configured to be provided laterally to the cylinder and connected to inside of the cylinder, wherein
a part of the cover is formed by the tank.
5. The shock absorber according to claim 1, wherein
the flange-shaped air piston is slidably in contact with both the inner periphery of the chamber member and also with the rod.
6. The shock absorber according to claim 1, wherein
one end of the rod is connected to the one end of the tubular chamber member, and another end of the rod is connected to the piston.

* * * * *